United States Patent
Martschitsch

(10) Patent No.: US 7,020,479 B2
(45) Date of Patent: Mar. 28, 2006

(54) METHOD AND SYSTEM FOR PREPARING AND TRANSMITTING SMS MESSAGES IN A MOBILE RADIO NETWORK

(75) Inventor: Andreas Martschitsch, Herzogenbuchsee (CH)

(73) Assignee: Swisscom Mobile AG, Bern (CH)

( * ) Notice: Subject to any disclaimer, the term of this patent is extended or adjusted under 35 U.S.C. 154(b) by 700 days.

(21) Appl. No.: 10/146,442

(22) Filed: May 14, 2002

(65) Prior Publication Data

US 2002/0193127 A1    Dec. 19, 2002

Related U.S. Application Data

(63) Continuation of application No. PCT/CH99/00545, filed on Nov. 17, 1999.

(51) Int. Cl.
*H04Q 7/20* (2006.01)

(52) U.S. Cl. .................... 455/466; 455/552.1; 455/558

(58) Field of Classification Search ............... 455/466, 455/412.1, 412.2, 566, 552.1, 558
See application file for complete search history.

(56) References Cited

U.S. PATENT DOCUMENTS

| | | | | |
|---|---|---|---|---|
| 5,752,188 A | | 5/1998 | Astrom et al. | 455/466 |
| 5,835,856 A | * | 11/1998 | Patel | 455/406 |
| 5,915,225 A | * | 6/1999 | Mills | 455/558 |
| 6,163,704 A | * | 12/2000 | Joong et al. | 455/466 |
| 6,427,076 B1 | * | 7/2002 | Skog | 455/433 |
| 6,477,366 B1 | * | 11/2002 | Valentine et al. | 455/416 |

FOREIGN PATENT DOCUMENTS

| | | |
|---|---|---|
| EP | 0 777 374 A1 | 6/1997 |
| WO | WO 98/33343 | 7/1998 |

\* cited by examiner

*Primary Examiner*—Temica Beamer
(74) *Attorney, Agent, or Firm*—Pearne & Gordon LLP

(57) ABSTRACT

Method for preparing and transmitting SMS messages in a mobile radio network, wherein a mobile radio user sends with his mobile device a USSD message comprising a service code for identifying a SMS sending service as well as an identification of the recipient and a text field. This USSD message is forwarded to a USSD handler. A gateway connected with this USSD handler converts said USSD message into at least one SMS message. Said SMS message is forwarded over a short message center to said recipient.

27 Claims, 2 Drawing Sheets

METHOD AND SYSTEM FOR PREPARING AND TRANSMITTING SMS MESSAGES IN A MOBILE RADIO NETWORK

The present application is a continuation of application PCT/CH99/00545 filed on Nov. 17, 1999, of which the content is included by reference.

FIELD OF THE INVENTION

The present invention concerns a method and a system for preparing and transmitting SMS messages in a mobile radio network.

RELATED ART

SMS (Short Message Service) messages in GSM mobile radio systems are already known. Unlike conventional voice and data traffic, no direct connection to the recipient for the transmission of SMS messages is established; rather, the text message entered by the sender is forwarded over a so-called Short Message Service Center (SMSC).

In this way, short messages of at most 160 alphanumeric characters can be sent between mobile devices. However, 160 characters allow only the transmission of very simple and short text messages. For many information services and applications, there is a need for a system that enables the transmission of longer, if possibly unlimited, messages.

Another disadvantage of SMS messages is the unpredictable transmission time. Depending on the settings of the SMSC by the network operator, SMS messages are sometimes transmitted only several hours after having been sent. For many services, this unpredictable transmission time is unacceptable.

Entering SMS messages with the input means of increasingly smaller mobile radio telephones is rather tedious and too complicated for many occasional users.

Additionally, USSD (Unstructured Supplementary Service Data) have been defined and standardized, for example in the GSM standard 02.90 of the European Telecommunications Standards Institute (ETSI). The advantage of USSD messages over SMS messages is that they are user-friendlier, since it is very easy for a user to enter a USSD service message. Furthermore, the length of the data field in USSD messages is unlimited, so that very long data can also be sent. Another advantage is that the transmission of a USSD message is quick and mostly free of charge, since the USSD message is forwarded over the signaling system, for example according to SS7.

USSD messages cannot, however, be transmitted between any two mobile radio users. A mobile user can send USSD messages only to a service, indicated by a three-digit service code, at a network provider. USSD messages are therefore not suitable for the exchange of text messages between mobile radio users.

It is therefore an aim of this invention to propose a new and improved method and system, with which longer text messages can also be exchanged between mobile radio users in a mobile radio network.

It is a further aim of the invention to propose a new and improved method and system, with which the disadvantages of SMS message transmission systems as well as the disadvantages of USSD message transmission systems can be avoided.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved in that a mobile radio user sends with his mobile device a USSD message comprising a service code for the identification of a SMS sender service as well as an identification of the recipient and a text field, in that said USSD message is forwarded to a Location Register, in that a gateway connected with this Location Register converts said USSD message into at least one SMS message, and in that said SMS message(s) is(are) forwarded over a short message center to said recipient.

This has the advantage that the mobile radio user wishing to send an alphanumeric message to another mobile radio user can do so with a USSD message. Such USSD messages, as previously mentioned, are easy to enter and their length is not limited.

In a gateway linked either with the Location Register of the visited network (VLR, Visitor Location Register) or with the Location Register of the mobile radio user's home network, this USSD message is converted into an SMS message and forwarded over a short message center to the indicated recipient.

This has the advantage of allowing also format conversions, for example in the case when the alphabet used for USSD messages comprises characters that are different or encoded differently from those of the alphabet used for SMS messages.

If the text field of the USSD message comprises more than 160 characters, the USSD message in said gateway is converted into several SMS messages that are forwarded in succession. Each of these SMS messages preferably contains a sequence number so that the recipient can reconstruct the sequence of the text portions.

USSD and SMS messages as such are already known. WO98/33343 describes for example an identification card comprising an application with which SMS or USSD messages can be sent in order to access a remote server. This method, however, does not allow mobile users to exchange SMS messages.

DESCRIPTION OF THE DRAWINGS

Hereafter, preferred embodiments of the invention will be described in more detail with the aid of the attached figures, in which.

DETAILED DESCRIPTION OF THE INVENTION

Although this invention describes in several details the special case of the embodiment in a GSM mobile radio network, the one skilled in the art will understand that this method can also be used with other types of radio networks, through which GSM and USSD messages can be transmitted. This invention can among others also be used with all WAP-capable networks, in which the WAP data can be transmitted either over SMS or over SMS bearers.

Figure 1:
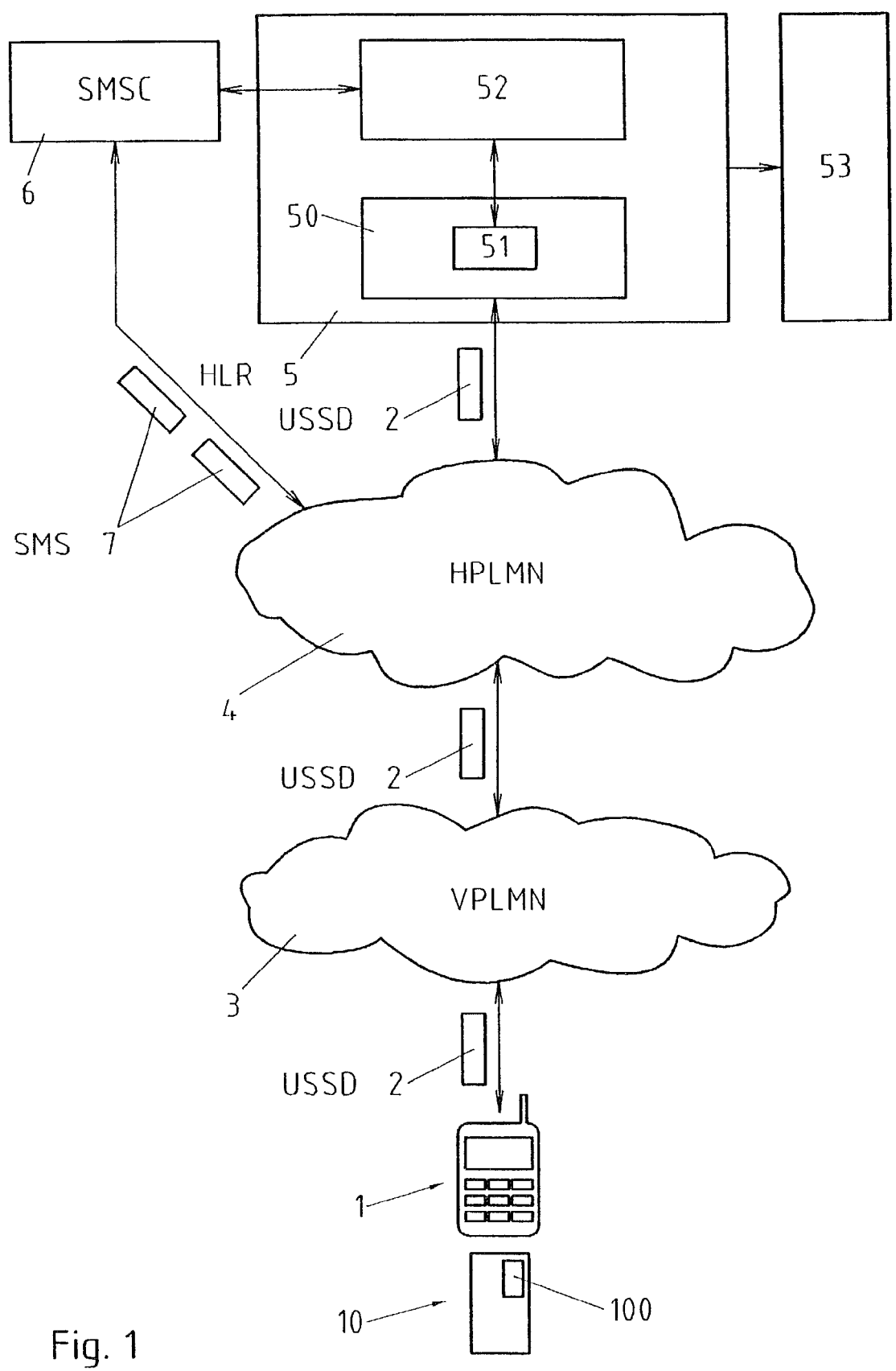
FIG. 1 shows a bloc diagram of a system with a mobile device, a visited mobile radio network VPLMN, a home mobile radio network HPLMN, a home data HLR and a short message center SMSC.

The number 1 of FIG. 1 refers to a mobile device, for example a mobile radio telephone for a GSM network, with an identification module, preferably an identification card 10, preferably a SIM (Subscriber Identification Module) or WIM (Wireless Application Protocol Identification Module) chip-card comprising data processing means 100 that can access a memory area (not represented). The SIM card 10 is preferably a JAVA-capable chip-card (JAVA is a trademark of SUN Microsystems) and can thus execute Java-applets received for example over an air interface, for example over a mobile radio network or over a close-range interface, for example according to BlueTooth, HomeRF or IrdA. The SIM card 10 can also be SIM-Application-Toolkit-capable and run applications.

The mobile device 1 and the identification module 10 are both preferably compatible with the SIM Application Toolkit specified in the GSM Technical Specification 11.14. The identification module is thus preferably a proactive chip-card that can initiate actions executed by the mobile device 1. Among others, the proactive SIM card can have texts and menu elements represented on the display of the mobile device 1, can react to selected menu elements and/or icons, initiate a dialog with the mobile user, have SMS and/or USSD messages sent, have help messages displayed, etc.

The mobile device in this Figure is registered in a visited network 3 (VPLMN, Visited Public Land Mobile Network) that preferably has concluded a roaming agreement with the home network 4 (HPLMN, Home Public Land Mobile Network) of the mobile user. The reference number 2 shows USSD messages that can be sent or received by the mobile device 1 and transmitted over the networks 3 and/or 4.

The reference number 5 refers to the mobile user's home data, hereafter called Home Location Register (HLR). This register is administered by the network operator from whom the mobile radio user has acquired the identification module 10. A USSD handler 50 is contained in or connected with the HLR 5 and checks all received USSD messages in order to decide which action is to be performed with it. A filter 51 in this USSD handler 50 recognizes among others the USSD messages applied and specially marked for the method according to the invention and forwards them to the gateway 52, as will be described further below.

The gateway 52 receives all the USSD messages forwarded by the filter 51 and converts them into SMS messages that are forwarded to the short message service center (SMSC) 6. The gateway 52 could also in a variant embodiment be integrated directly in the center 6. The SMSC can then forward these SMS messages 7, or the sequence of SMS messages, through known mechanisms, to the recipient indicated.

The reference number 53 refers to a billing center that among others bills all the SMS messages sent by the mobile user 1. According to the invention, USSD messages that are converted in SMS with the claimed method are also billed by this billing center.

Figure 3:
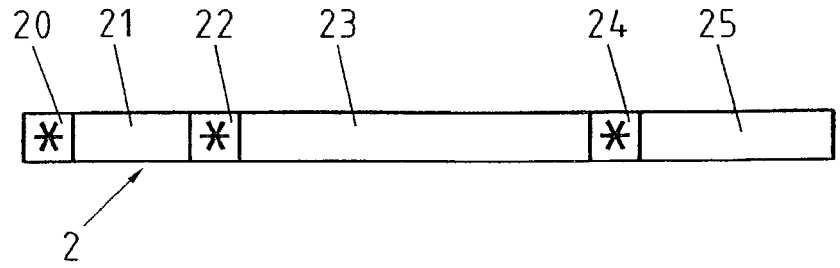
FIG. 3 shows an example of a USSD message.

FIG. 3 shows an example of a USSD message 2 that can be entered by the user of the mobile device 1. The USSD message contains, from left to right, a first delimitating character, in this example a *, followed by a three-digit service code 21. According to the aforementioned GSM 02.90 standard, the service code can have any value in the range from 100 to 1999. If the service code has a value between 100 and 149, the USSD message is to be forwarded to the HLR of the mobile radio user. If, on the other hand, the service code 21 has a value between 150 to 1999, the VPLMN 3, in particular the Visitor Location Register (VLR) described further below, can decide how this USSD message is to be processed.

A second delimitating character 33 is used after the service code 21, in this example a *. After this sign follows a text field 23 of any length, for example a length greater than 160 characters. The text field 23 can preferably contain alphanumeric characters. An alphabet indicator (not represented) and a language indicator (not represented) in the SMS message 2 preferably define which alphabet and which language are currently being used. Characters that do not belong to the used alphabet can be encoded, for example by entering their ASCII code.

A delimitating character 24 separates the text field 23 from the recipient field 25 that identifies the recipient to whom the message is to be forwarded. The recipient field preferably comprises the recipient's MSISDN number (call number) or another unambiguous identification indication.

USSD messages with this format are preferably entered with the aid of a program that is preferably stored in a storage area of the identification module 10. The program is preferably a JAVA applet and can thus be downloaded into the identification module 10 over an air interface, for example over the mobile radio network 3 resp. 4 and/or over an interface at close range (not represented), for example an IrdA, Bluetooth or HomeRF interface. The entering of the USSD message is furthermore preferably facilitated with a so-called SIM Took Kit Menu, defined in the identification module 10 on the display of the mobile device 1. Said program and the menu elements can also be commercialized separately, for example as a downloadable program portion or as a programmable data carrier.

The SIM Toolkit Menu can for example request from a mobile radio user that he enters the text field 23 and the recipient field 25 or selects from a directory, for example a call number directory in the identification module or a WAP White Book directory. The other delimitating characters 20, 22, 24 and the service code 21 can then be completed automatically by the SIM Toolkit application. In a variant embodiment the mobile radio user can, however, compose himself the USSD message 2 without the aid of the SIM Toolkit Menu by typing the necessary characters himself on the keyboard of the mobile radio device.

If the USSD message contains a service code in the range from 100 to 149, it is forwarded over the signaling system SS7 directly and free of charge in the HLR 5 of the mobile radio user, as described above. A USSD handler 50 in this HLR receives all incoming USSD messages and decides on the basis of the service code 21 and/or other parts of the USSD message how the latter is to be processed. A filtering element 51 in the USSD handler 50 recognizes in particular all USSD messages bearing the service code 21 of the service according to the invention, and forwards them automatically to the gateway 52. The filtering element 51 consists preferably of a software module in the HLR that compares the service codes 21 of all received USSD messages with a predefined value corresponding to the conversion service according to the invention.

The gateway 52 receives the messages selected by the filter 51 and converts them into SMS messages. For this purpose, the text field 23 is split into one or several character strings having a maximum of 160 characters and which are then packed in a corresponding number of SMS messages and completed with the recipient address indicated in the recipient field 25.

If the USSD message contains characters that do not belong to the alphabet for SMS messages, the gateway 52 converts these characters into characters allowable for SMS messages. If, on the contrary, the SMS alphabet comprises characters that do not belong to the USSD alphabet and that have to be encoded, as mentioned above, the gateway replaces these codes with the corresponding SMS characters.

The conversion performed by the gateway 52 can also depend on the service code in the USSD message. This enables USSD messages with a certain service code to be converted into SMS messages with standardized commands for an information service. In this manner, a mobile radio user can access an SMS information service through USSD.

If the text field 23 contains more than 160 characters, each generated SMS message is numbered preferably in the body or in the header so that the sequence of the text parts can be reconstructed by the recipient.

The SMS message 7 generated by the gateway 52 is then forwarded like a conventional SMS message over the short message center 6 and the mobile radio network 4 to the selected recipient. The recipient can then display, store and further process this SMS message like a normal message. If the original USSD message is split by the gateway 52 into several SMS messages, an application in the SIM or WIM card of the recipient preferably ensures that these different parts are reproduced correctly and in the original sequence.

A billing center 53 is preferably connected with the HLR 5 and can thus bill to the mobile radio user 1 the conversion of USSD messages and the forwarding of SMS messages with known billing methods, for example with a monthly bill or through debiting a prepaid amount in the identification module 10.

Figure 2:
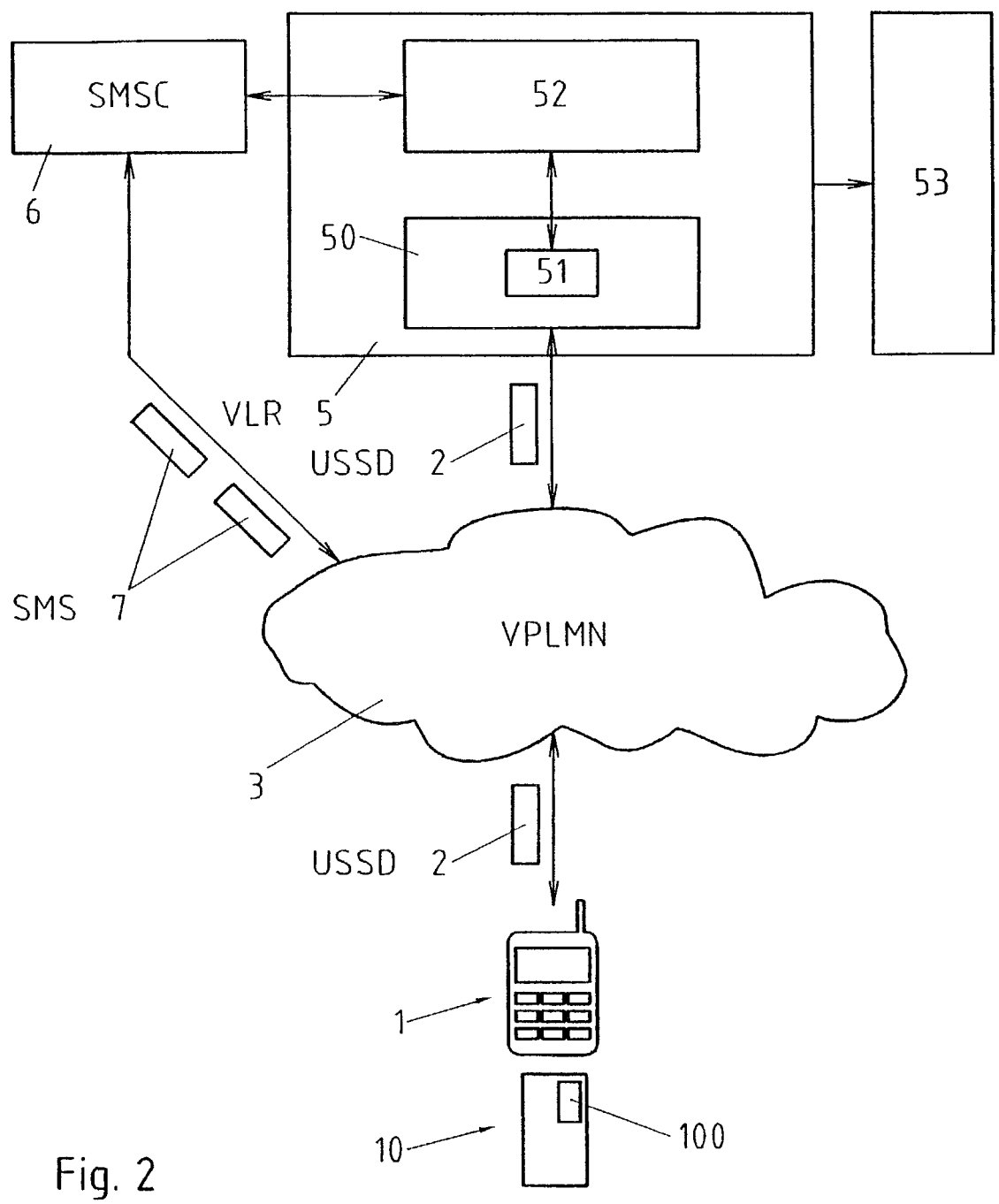
FIG. 2 shows a bloc diagram of a system with a mobile device, a visited mobile radio network VPLMN, a VLR and a short message center SMSC.

FIG. 2 shows another embodiment of the invention, in which the USSD messages sent out by the mobile radio user 1 with the method described above are converted by the gateway 52 in the VLR (Visitor Location Register) of the visited mobile radio network 3 (VPLMN) into SMS messages. For this purpose, the mobile radio user, respectively the aforementioned program for acquiring USSD messages, must enter a service code 21 in the range from 150 to 199. In this case, this USSD message is processed by the infrastructure of the visited network, for example by the VLR 5. A filter 51 in the USSD handler 50 recognizes USSD messages with the service code of the service according to the invention and forwards these messages to the gateway 52 that forwards them to the short message center 6 as described above. The filter 51 could, however, be programmed to forward USSD messages in every case to the HLR 5 of the mobile radio user 1 or of the recipient.

In this embodiment, the billing center 53 preferably sends socalled Call Details Records (CDR) to the mobile radio user 1's home mobile radio network that then bills this service to the mobile radio user.

The one skilled in the art will understand that both embodiments of FIGS. 1 and 2 can be used simultaneously. In this case, a mobile radio user who registers into a visited mobile radio network VPLMN 3 can decide by selecting another service code whether the sent USSD message is to be converted into an SMS message in the LR of the visited network 3 or in the HLR of his home network 4. This has the advantage that he can in many cases send the transmitted text over fast and free of charge USSD up to the network 3 or 4 in which the recipient is located and that the slow and costly SMS messages are used only for the last stretch within this recipient network.

This method allows the transmission not only of text messages, but also of datagrams, in particular multi-media objects, program portions, applets etc. that can be encoded in the text field 23 and converted by the gateway 52 into SMS datagrams, preferably according to the SICAP method proposed by the applicant and described in patent EP689368. Thus, a mobile radio user wishing to send a longer object, for example an applet, to another mobile radio user can package this object in a USSD message, address this USSD message to the gateway 52 where it is automatically split into a plurality of SMS messages that are then put together again in the receiving device. This has the advantage that the mobile radio user does not have to deal with the splitting of his object into several objects: this function is performed by the infrastructure made available in the gateway 52.

Said application in the identification module with which USSD messages 2 are processed and forwarded can also be used to sign and/or encrypt these USSD messages. The message is preferably signed with an electronic certificate of the mobile radio user stored in the identification module 10 and encrypted with the public key of the home network operator and/or preferably of the recipient. In this case, the gateway 52 is preferably programmed so as to enable the conversion of the USSD message into an SMS message without modification of the hash value of the signed part, for example of the text field. In this case, no character, in particular no space, is replaced or added in the text field, so that the recipient can determine the sender's hash value and verify the message's integrity.

Even if the USSD handler 50 is usually implemented in the HLR 5 or directly connected with this HLR, its function could also be performed by another server, for example by a server in the Internet.

The one skilled in the art will understand that the gateway 52 can also convert the USSD messages forwarded by the filter 51 into other formats, for example in IP or GPRS packages, in e-mails, etc. The USSD handler can in this case comprise several filters of the type 51 corresponding to different service codes, each service code allowing the conversion of the USSD message into another format. Thus, the mobile radio user can easily decide by selecting the service code in which format the recipient should receive his message. If the number of free service codes is scarce, a field in the USSD message can also be defined to determine which conversion the gateway 52 should perform.

The system according to the invention can also be used to send SMS messages with a mobile device or with a computer and convert them into USSD messages by the gateway 52 that can then be forwarded by the USSD handler 50. Thus, devices that can process only SMS messages but no USSD messages can access USSD services.

What is claimed is:

1. Method for preparing and transmitting SMS messages in a mobile radio network, wherein:

a mobile radio user sends with his mobile device a USSD message comprising a service code for identifying an SMS sending service as well as an identification of the recipient and a text field for text or other encoded objects, said USSD message is forwarded to a USSD handler, a gateway connected with said USSD handler converts said USSD message into at least one SMS message, and said SMS message(s) is(are) forwarded over a short message center to said recipient.

2. The method of the claim 1, wherein said identification of the recipient is a MSISDN number.

3. The method of claim 1, wherein said mobile device is a GSM phase 2+ device compatible with GSM Toolkit, and said USSD message is entered with a GSM Toolkit Menu.

4. The method of claim 3, wherein the GSM Toolkit Menu parameters are downloaded over the air interface in a SIM card.

5. The method of claim 1, wherein said message is entered with the aid of an application stored in the mobile user's identification module.

6. The method of claim 5, wherein said application is a JAVA applet.

7. The method of claim 5, characterized in that said application is downloaded over the air interface into said identification module.

8. The method of claim 1, wherein
said SMS message uses a first alphabet with characters that do not belong to the alphabet of said USSD message,
said mobile radio user enters special codes when he wishes to use said characters, and
said gateway converts these special codes into said characters.

9. The method of claim 1, wherein said USSD message is forwarded to a Visited Location Register (VLR) in the visited mobile radio network when a first service code is entered, and to the Home Location Register (HLR) of said mobile radio user when a second service code is entered.

10. The method of claim 1, characterized in that said Location Register is connected with a billing system that bills to said mobile radio user the conversion of said USSD message into at least one SMS message.

11. The method of claim 1, wherein said USSD message is converted into several SMS messages that are forwarded sequentially when the length of said text field exceeds the length allowable for a SMS.

12. The method of claim 11, wherein each SMS message in a sequence of SMS messages contains a sequence number.

13. The method of claim 1, wherein said text field contains a datagram.

14. The method of claim 1, wherein said USSD message is filtered in said Location Register on the basis of said service code and forwarded to said gateway.

15. A system for converting and forwarding messages, comprising:
a USSD handler for receiving USSD messages received over a mobile radio network and of recognizing with a filter specially marked received USSD messages, and
a gateway for converting said recognized specially marked USSD messages into SMS messages and forwarding them over a short message center to a recipient identified in said USSD messages.

16. The system of claim 15, further identifying said recipients on the basis of their MSISDN number.

17. The system of claim 15, said gateway further performing an alphabet conversion.

18. The system of claim 15, said gateway further converting USSD messages with a certain service code into SMS messages with orders for an information service.

19. The system of claim 15, wherein said USSD handler is connected with a Location Register.

20. The system of claim 19, further deciding on the basis of the identification of said mobile radio user contained in said USSD message whether it forwards the USSD message to said gateway or to the Home Location Register of the mobile radio user.

21. The system of claim 19, further deciding on the basis of a service code contained in the USSD message whether it forwards the USSD message to said gateway or to the Home Location Register of the mobile radio user.

22. The system of claim 15, further comprising a billing system for billing said conversion to said mobile radio user.

23. The system of claim 15, further converting a USSD message into several SMS messages that are forwarded sequentially if the length of said text field exceeds the length allowable for a SMS.

24. The system of claim 23, further adding a sequence number to each SMS message in a sequence.

25. A SIM card comprising data processing means and a storage area for storing a program for execution by said processing means for encoding alphanumeric characters including alphabetic characters entered in a mobile device into numeric digits for sending as a USSD message.

26. The SIM card of claim 25, wherein said card is compatible with GSM Phase 2+ and wherein menu parameters are stored for displaying a menu on the display of a mobile device, said menu facilitating the entering of USSD messages.

27. The SIM card of claim 26, wherein said menu allows the entering of USSD messages in a predefined format allowing the entering of at least one text field and the identification of a recipient.

* * * * *